United States Patent [19]
Ji et al.

[11] Patent Number: 5,651,063
[45] Date of Patent: Jul. 22, 1997

[54] HINGE APPARATUS FOR A FOLDABLE TELEPHONE

[75] Inventors: Young-Bae Ji, Seoul; Young-Seok Yoon, Ahnyang, both of Rep. of Korea

[73] Assignee: SamSung Electronics Co., Ltd., Suwon, Rep. of Korea

[21] Appl. No.: 500,762

[22] Filed: Jul. 11, 1995

[30] Foreign Application Priority Data

Aug. 23, 1994 [KR] Rep. of Korea .................. 20799/1994

[51] Int. Cl.$^6$ ...................................................... H04M 1/00
[52] U.S. Cl. ............................................ 379/433; 379/434
[58] Field of Search .................................. 379/433, 434, 379/428; 455/89, 90, 128; 16/342

[56] References Cited

U.S. PATENT DOCUMENTS

| | | |
|---|---|---|
| 4,897,873 | 1/1990 | Beutler et al. . |
| 5,185,790 | 2/1993 | Mischneko . |
| 5,257,310 | 10/1993 | Takagi et al. . |
| 5,259,019 | 11/1993 | Stilley . |
| 5,260,998 | 11/1993 | Takagi . |
| 5,278,993 | 1/1994 | Reiff et al. . |
| 5,303,291 | 4/1994 | Takagi et al. . |
| 5,335,273 | 8/1994 | Takagi et al. . |

FOREIGN PATENT DOCUMENTS 93-901025  10/1992  Rep. of Korea .

*Primary Examiner*—Jack K. Chiang
*Attorney, Agent, or Firm*—Robert E. Bushnell, Esq.

[57] ABSTRACT

A hinge apparatus for a foldable telephone includes a body portion for mounting electronically operable parts and a flip member for covering the body portion. The flip member is assembled with the body portion by means of a pair of hinge shafts that pivot within a predetermined range of angles. A pair of resilient members are provided for influencing rotation of the hinge shafts. Each of the hinge shafts includes a resilient member contact portion that is engaged by a respective resilient member for enabling the flip member to snappingly pivot on the hinge shafts.

21 Claims, 6 Drawing Sheets

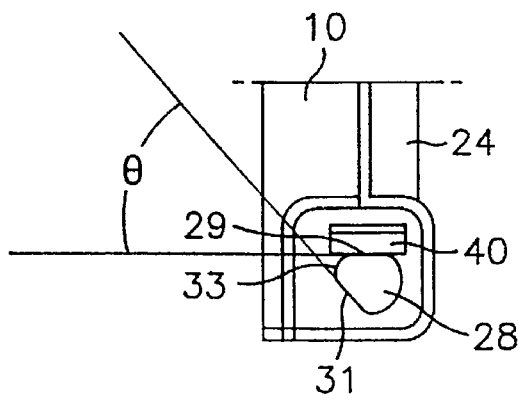
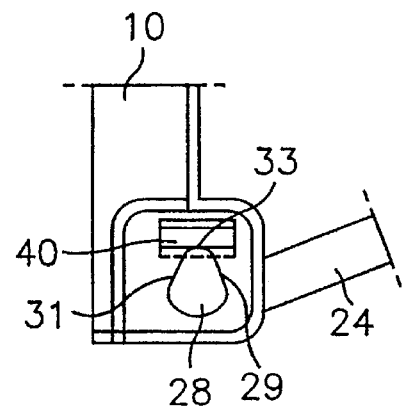
FIG. 4A    FIG. 4B
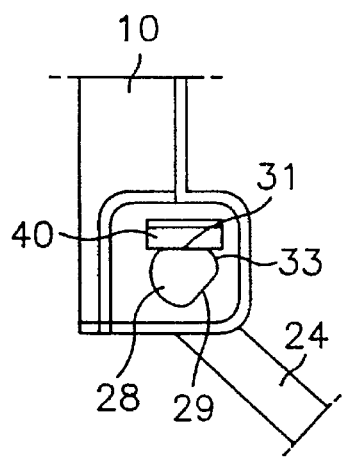
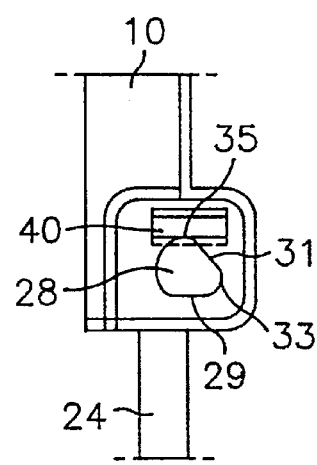
FIG. 4C    FIG. 4D

HINGE APPARATUS FOR A FOLDABLE TELEPHONE

CROSS-REFERENCE TO RELATED APPLICATIONS

This application makes reference to, incorporates the same herein, and claims all benefits accruing under 35 U.S.C. §119 from an application for Hinge Apparatus For A Foldable Telephone earlier filed in the Korean Industrial Property Office on 23 Aug. 1994 and assigned Serial No. 20799/1994.

TECHNICAL BACKGROUND

The present invention relates to a foldable telephone having a body portion for mounting electronically operable parts and a flip member for covering the body portion, and more particularly to a hinge apparatus for connecting the flip member with the body portion in a foldable telephone.

In a foldable telephone, such as a handphone, the housing generally includes a body portion for mounting electronically operable parts and a flip member for covering and protecting the body portion. Such a foldable telephone requires a hinge apparatus for connecting the flip member with the body portion, and for allowing the flip member to pivot to a position necessary for telephone operation. Korean Patent Laid-Open Publication No. 93-701025 discloses such a hinge mechanism.

The hinge mechanism of such conventional foldable telephones typically has a cylindrical shaft with a recess for cooperating with a follower. The shaft enables the flip member to pivot and the recess cooperates with the follower provided in the body portion so as to securely maintain the flip member in the operating position. Thus, the flip member may pivot between the operating position and the protecting position where the flip member covers the body portion and protects the switch buttons. The microphone is mounted below the front surface of the body portion, or in the flip member. With such conventional art, however, the follower often moves linearly via a spring and has side surfaces that interfere with side surfaces of the flip member, thereby resulting in an unbalanced pivoting of the flip member.

A more recent effort to develop a hinge mechanism for a foldable telephone is disclosed in U.S. Pat. No. 5,335,273 entitled Portable Telephone And Multifunctional Protective Housing Therefor issued to Takagi et al. on 2 Aug. 1994. In Takagi et al. '273, U-shaped springs are utilized to press a cover of the telephone against the telephone body based on angular plate portions of rotational shafts. While this type of conventional art provides a modicum of improvement over earlier art in that it does not require a locking mechanism to maintain the cover in a closed position, I believe that conventional art, such as Takagi et al. '273, can still be improved upon.

SUMMARY OF THE INVENTION

Accordingly, it is an object of the present invention to provide an improved hinge apparatus for a foldable telephone.

It is another object to provide a hinge apparatus having a simple structure for connecting the flip member with the body portion in a foldable telephone.

It is still another object to provide a hinge apparatus in a foldable telephone where the flip member pivots in a balanced manner relative to the body portion.

It is yet another object to provide means for mounting a microphone proximal to the hinge shaft in a foldable telephone.

These and other objects can be achieved with a hinge apparatus for a foldable telephone having a body portion for mounting electronically operable parts and a flip member for covering and protecting the body portion. The flip member is assembled with the body portion so as to pivot within a predetermined range of angles. A pair of protuberances are integrally formed at a lower end of the flip member to enable connection of the flip member with the body portion by means of a pair of hinge shafts respectively inserted into a pair of holes respectively formed in the pair of protuberances. A pair of recesses are formed in a lower end of the body portion for respectively receiving the pair of protuberances. The pair of recesses respectively have a pair of arcuate portions for respectively supporting the pair of hinge shafts. A pair of resilient members are provided for influencing rotation of the pair of hinge shafts, respectively. A pair of resilient member fixing openings for accommodating installation of the pair of resilient members are respectively formed between each of the pair of recesses and each of the corner portions of the lower end of the body portion. Each of the pair of hinge shafts includes a contact portion for engaging and receiving force from a respective one of the resilient members. Each of the hinge shafts also has a hole inserting portion that inserts into a respective one of the pair of holes. Each of the resilient members includes a resilient portion for engaging a respective one of the contact portions.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 4A to 4D illustrate cross sections of a main portion of the hinge apparatus constructed according to the principles of the present invention;

DETAILED DESCRIPTION OF THE PREFERRED EMBODIMENTS

Figure 1:
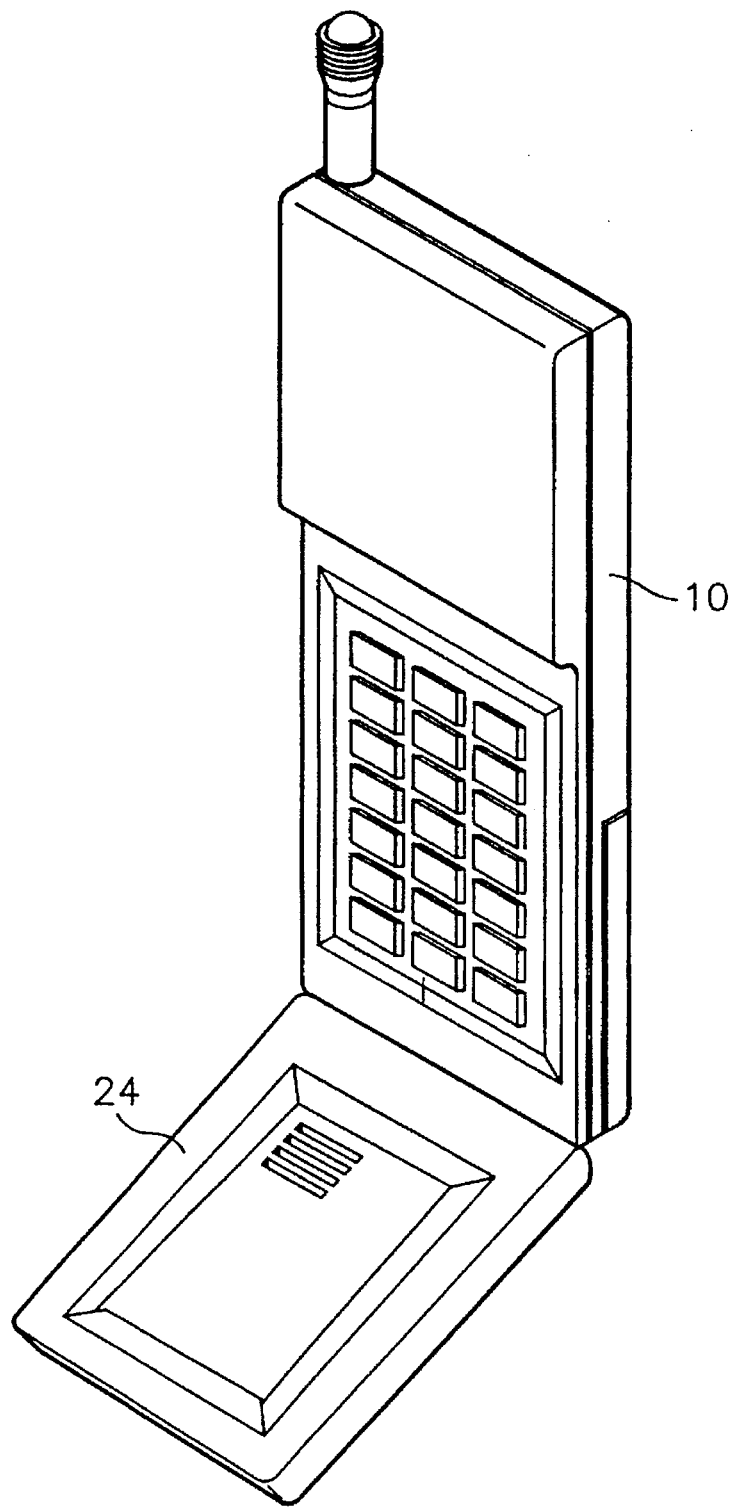
FIG. 1 is a perspective view illustrating a foldable telephone, such as handphone, where the flip member is pivoted to an operating position by a hinge apparatus constructed according to the principles of the present invention.

FIG. 1 is a perspective view illustrating an exemplary foldable telephone constructed according to the principles of the present invention. The foldable telephone is composed of a flip member 24 pivotally connected to a body portion 10.

Figure 2:
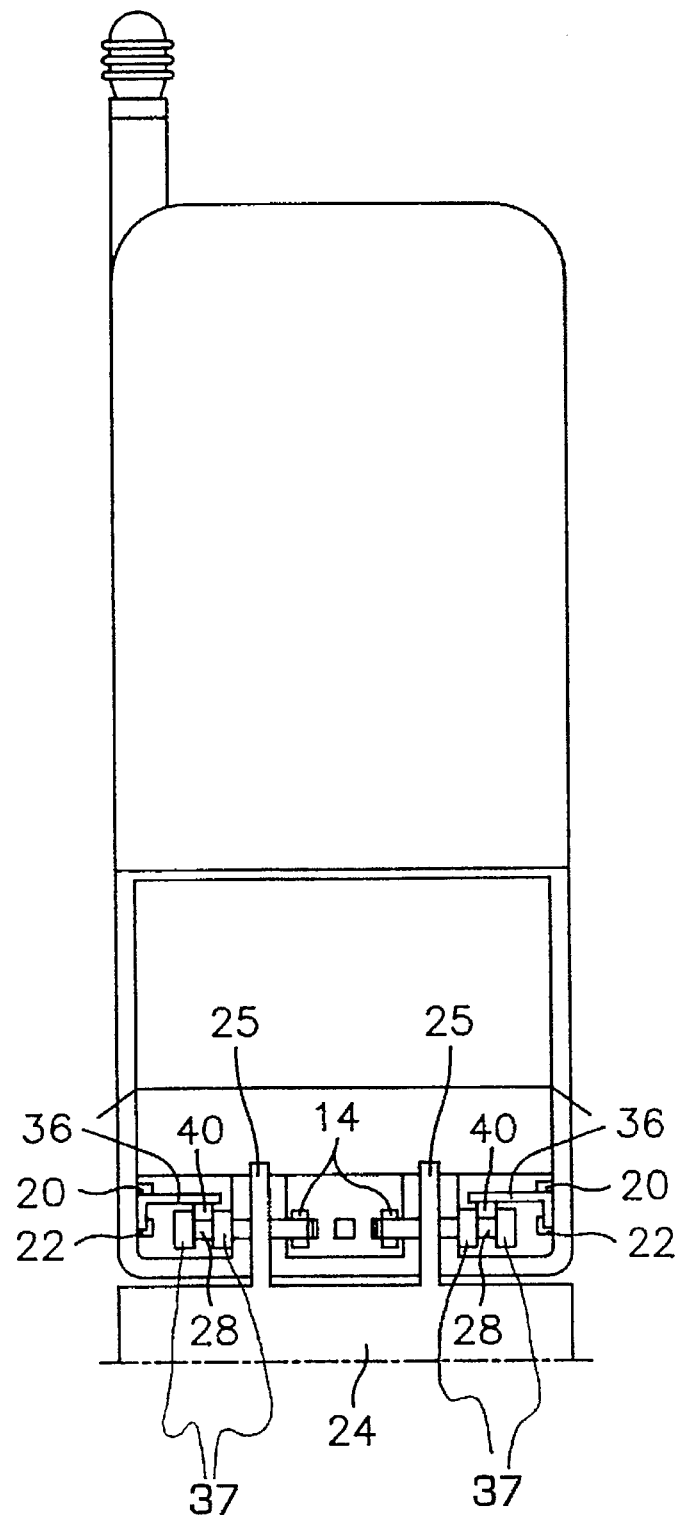
FIG. 2 is a plane view schematically illustrating the hinge apparatus constructed according to the principles of the present invention mounted in a foldable telephone.
Figure 3:
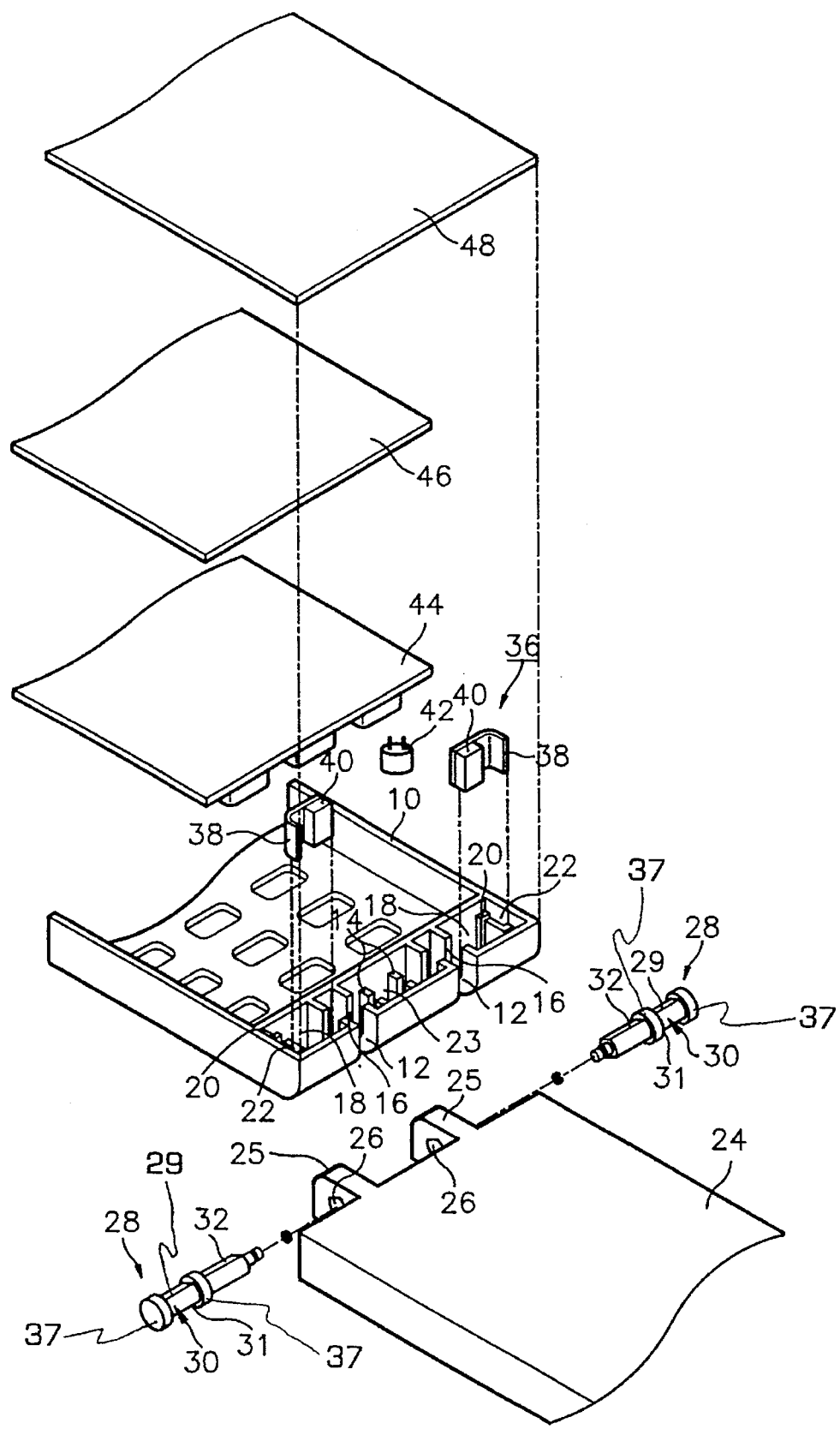
FIG. 3 is an exploded perspective view illustrating the assembly of the hinge apparatus constructed according to the principles of the present invention.

Referring now to FIGS. 2 and 3, flip member 24 is pivotally connected to the lower end of body portion 10 by means of the hinge apparatus constructed according to the principles of the present invention. The inventive hinge apparatus includes a pair of recesses 12 formed in the lower end of body portion 10 for receiving a pair of protuberances 25 of flip member 24. Between recesses 12 an aperture 23 is formed for mounting a microphone 42. Further provided between recesses 12 are a pair of guide slots 14 for guiding a pair of hinge shafts 28. Arcuate portions 16 for holding hinge shafts 28 are formed in the sidewalls of each of the recesses 12. A pair of openings 18 are respectively formed between each of the pair of recesses 12 and each of the corner portions of the lower end of body portion 10 for respectively receiving a pair of resilient members 36. Each of the openings 18 includes a resilient member bearing slot 22 and a guide rib 20 for accommodating insertion of a fixing portion 38. Protuberances 25 are formed integrally with the lower end of flip member 24 for connecting flip member 24 with body portion 10 via hinge shafts 28 respectively inserted into a pair of holes 26 respectively formed in protuberances 25.

Each of the hinge shafts 28 includes a contact portion 30 for engaging and receiving the force from a respective one of resilient members 36. Each of the hinge shafts 28 also includes a hole inserting portion 32 that inserts into a respective one of the holes 26 and two circular portions 37. Circular portions 37 separate contact portions 30 from hole inserting portions 32 and are placed on one end of each hinge shaft 28. Contact portion 30 of hinge shaft 28 is cylindrically shaped and has a first planar surface 29 and a second planar surface 31 that form a predetermined angle of about 45 degrees between each other. First planar surface 29 connects with second planar surface 31 at a first edge 33 (see FIG. 4A). A second edge 35 is positioned adjacent to second planar surface 31 (see FIG. 4D). Each hole inserting portion 32 has a pair of planar surfaces to prevent rotation of the hole inserting portions 32 in holes 26 of protuberances 25. Fixing portions 38 of resilient members 36 are L-shaped and fit snugly into respective resilient member bearing slots 22. Fixing portions 38 are supported by respective guide ribs 20 and slots 22. Each resilient member 36 also includes a resilient portion 40 for engaging the contact portion 30 of the respective hinge shaft 28. Resilient portion 40 has a length substantially equal to the length of contact portion 30, so that resilient portion 40 fits conformingly between the circular portions 37 of the respective hinge shaft 28 (see FIG. 2).

During assembly, hole inserting portions 32 of hinge shafts 28 are inserted into the respective holes 26 of flip member 24 whose protuberances 25 are inserted into recesses 12 of body portion 10. Hinge shafts 28 are then placed into the arcuate portions 16 and guide slots 14 of body portion 10. Resilient members 36 are inserted into resilient member bearing slots 22 so that resilient portions 40 are positioned between respective sets of circular portions 37 and can engage the contact portions 30 of the hinge shafts 28 (see FIG. 2). Microphone 42 is next mounted in aperture 23 of body portion 10. Finally, a rubber switch portion 44, a printed circuit board 46 and a covering 48 are sequentially mounted onto body portion 10.

Referring now to FIGS. 4A to 4D, the pivotal motion of flip member 24 will now be described. The foldable telephone is initially maintained in a closed position where flip member 24 is folded into body portion 10, thereby protecting body portion 10. In this position, first planar surfaces 29 of hinge shafts 28 are engaged by resilient portions 40 of resilient members 36 so that flip member 24 is unable to pivot into the operating position without exerting an external force upon flip member 24. This position represents the on-hook state of the foldable telephone and is depicted in FIG. 4A.

In order to open flip member 24 to the operating position representing the off-hook state of the foldable telephone, flip member 24 is pulled away from body portion 10 so that hinge shafts 28 pivot together with flip member 24 and resilient portions 40 exert a force upon first edges 33 of hinge shafts 28, as shown in FIG. 4B. In this unstable condition, the force from resilient portions 40 continues to act upon first edges 33 in a manner such that hinge shafts 28 and flip member 24 tend to pivot in either the counterclockwise position where resilient portions 40 would engage first planar surfaces 29 and the on-hook state would be resumed, or in the clockwise position where resilient portions 40 would engage second planar surfaces 31 and the off-hook state would be established. Referring to FIG. 4C, resilient portions 40 engage second planar surfaces 31 and thereby securely maintain flip member 24 in a position corresponding to the off-hook state of the telephone. In the off-hook state depicted in FIG. 4C, the angle between flip member 24 and body portion 10 is maintained at about 135 degrees.

Referring now to FIG. 4D, if flip member 24 is rotated past the position shown in FIG. 4C corresponding to the off-hook state of the telephone, hinge shafts 28 pivot together with flip member 24 and resilient portion 40 engages and applies a force to second edges 35 of hinge shafts 28. In this position, flip member 24 can not be rotated anymore due to contact with body portion 10. Hence, resilient portions 40 cause flip member 24 to automatically return to the normal position corresponding to the off-hook state.

After a telephone call is completed, if flip member 24 is rotated counterclockwise towards body portion 10, resilient portions 40 of resilient members 36 snappingly return to contact first planar surfaces 29 of hinge shafts 28, thus placing flip member 24 back over body portion 10 as depicted in FIG. 4A.

Figures 5A, 5B:
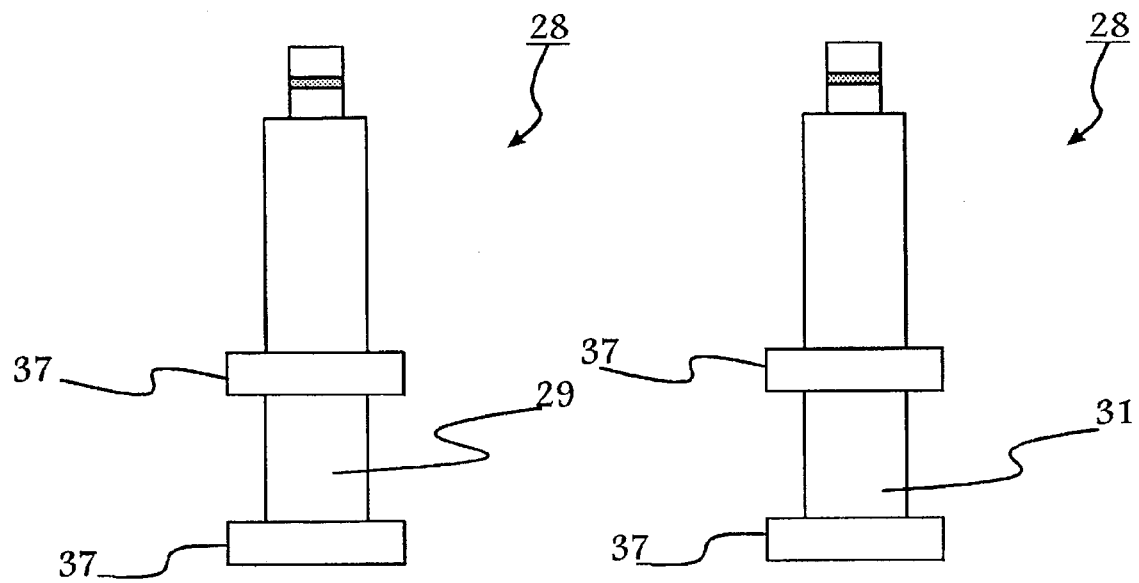
FIGS. 5A to 5C are side views of the hinge shaft used in the hinge apparatus constructed according to the principles of the present invention.
Figure 5C:
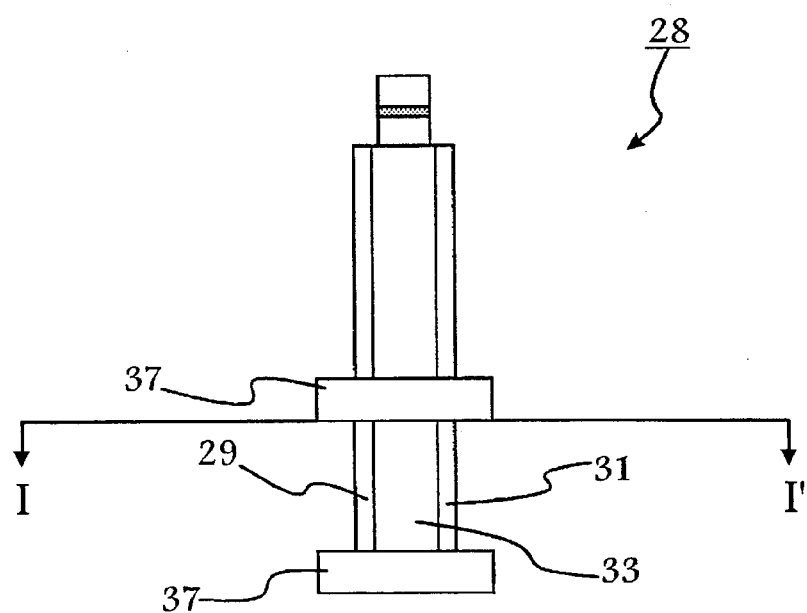

Referring now to FIGS. 5A to 5C, top views of hinge shaft 28 are illustrated. FIG. 5A shows the top view of hinge shaft 28 when looking directly down upon first planar surface 29. FIG. 5B shows the top view of hinge shaft 28 when looking directly down upon second planar surface 31. FIG. 5C shows the top view of hinge shaft 28 when looking directly down upon first edge 33. In the view shown in FIG. 5C, first and second planar surfaces 29 and 31 are visible on respective sides of first edge 33.

Figure 6:
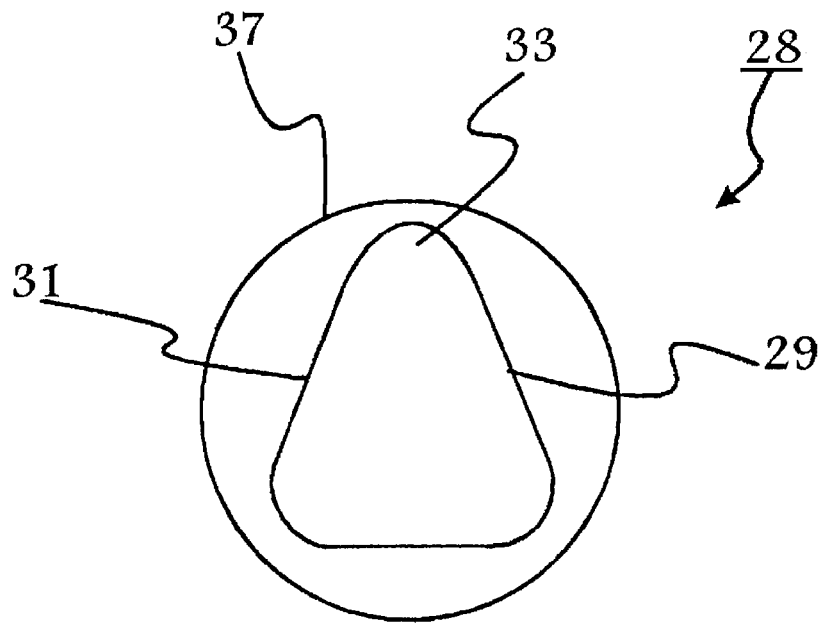
FIG. 6 is a cross-sectional view of the hinge shaft taken in accordance with view lines II' shown in FIG. 5C.

Referring to FIG. 6, a cross-sectional view of hinge shaft 28 taken in accordance with view lines II' in FIG. 5C is shown. FIG. 6 clearly shows the structural relationship among first planar surface 29, second planar surface 31, first edge 33 and one circular portion 37 of hinge shaft 28.

Figure 7:
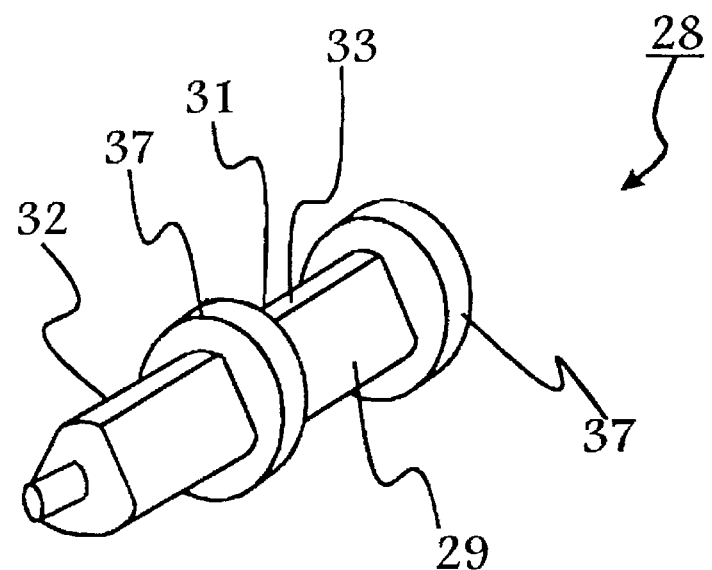
FIG. 7 is a perspective view of the hinge shaft used in the hinge apparatus constructed according to the principles of the present invention.

Referring now to FIG. 7, a perspective view of hinge shaft 28 is illustrated. FIG. 7 clearly shows the structural relationship among first planar surface 29, second planar surface 31, first edge 33, circular portions 37 and hole inserting portion 32 of hinge shaft 28.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A hinge apparatus for a foldable telephone, comprising:
   a body portion having a lower end for mounting electronically operable parts;
   means for covering said body portion, said covering means having an upper end pivotally connected with said body portion to pivot relative to said body portion within a predetermined angular range;
   a pair of protuberances integrally formed at the upper end of said covering means for connecting said covering means with said body portion;
   a pair of hinge shafts respectively inserted into a pair of holes respectively formed in said pair of protuberances, each one of said hinge shafts comprising first and second planar surfaces with said first planar surface having a substantially non-parallel orientation with respect to said second planar surface, and first and second raised portions disposed around said first and second planar surfaces;
   a pair of recesses formed in the lower end of said body portion for respectively receiving said pair of protuberances, said pair of recesses respectively having a pair of arcuate portions for respectively supporting said pair of hinge shafts;
   a pair of resilient members engaging and applying a rotational force upon said pair of hinge shafts, respectively, each one of said resilient members having a planar contact surface engaging only said first planar surface of the respective one of said hinge shafts when said covering means is in a closed position relative to said body portion and engaging only said second planar surface of said respective one of said hinge shafts when said covering means is in an open position relative to said body portion, said planar contact surface exhibiting a first length that is substantially equal to a second length that defines a distance between said first and second raised portions; and
   a pair of openings each formed between a respective one of said pair of recesses and a respective corner portion of the lower end of said body portion, said pair of openings for respectively accommodating insertion of said pair of resilient members.

2. The hinge apparatus of claim 1, wherein each one of said resilient members comprises a connecting portion for securing a corresponding one of said resilient members in a respective one of said openings.

3. The hinge apparatus of claim 2, wherein said first planar surface is separated from said second planar surface by an intermediate continuous arcuate surface, said first planar surface forming a predetermined angle with said second planar surface.

4. The hinge apparatus of claim 3, wherein said predetermined angle is about 45 degrees.

5. The hinge apparatus of claim 2, wherein said connecting portion of each one of said pair of resilient members has an L-shaped cross-section.

6. The hinge apparatus of claim 1, wherein said first planar surface is separated from said second planar surface by an intermediate continuous arcuate surface, said first planar surface forming a predetermined angle with said second planar surface.

7. The hinge apparatus of claim 6, wherein said predetermined angle is about 45 degrees.

8. The hinge apparatus of claim 1, wherein each one of said hinge shafts further comprises a hole inserting portion having a pair of planar surfaces for preventing said hole inserting portion from rotating while said hole inserting portion is inserted into a respective one of said pair of holes respectively formed in said pair of protuberances.

9. The hinge apparatus of claim 4, wherein said connecting portion is L-shaped.

10. The hinge apparatus of claim 1, wherein said body portion further comprises a pair of guiding portions for respectively guiding said pair of hinge shafts.

11. A hinge apparatus for a foldable telephone, comprising:
    a body portion;
    a flip member pivotally connected to said body portion to rotate with respect to said body portion within a predetermined angular range;
    a pair of hinge shafts for connecting said body portion to said flip member and enabling rotation of said flip member relative to said body portion within said predetermined angular range, each one of said pair of hinge shafts comprising first and second planar surfaces with said first planar surface having a substantially non-parallel, predetermined angular orientation with respect to said second planar surface, and first and second circular portions disposed around said first and second planar surfaces; and
    a pair of resilient members installed within said body portion engaging and exerting a rotational force upon said pair of hinge shafts, respectively, each one of said pair of resilient members having a planar contact surface for engaging only said first planar surface of the respective one of said pair of hinge shafts when said flip member is in a closed position relative to said body portion and engaging only said second planar surface of the respective one of said pair of hinge shafts when said flip member is in an open position relative to said body portion, said planar contact surface exhibiting a first length that is substantially equal to a second length that defines a distance between said first and second circular portions.

12. The hinge apparatus of claim 11, wherein said first planar surface of each one of said pair of hinge shafts has said predetermined angular orientation of about 45 degrees with respect to said second planar surface of a corresponding one of said pair of hinge shafts.

13. The hinge apparatus of claim 11, wherein said body portion comprises a pair of slotted openings having dimensions conforming to dimensions of said pair of resilient members, respectively, to accommodate installation of said pair of resilient members into said body portion.

14. A hinge apparatus of a foldable telephone, comprising:
    a body portion;
    a flip member pivotally connected to said body portion to rotate relative to said body portion within a predetermined angular range;
    first and second hinge shafts installed within said body portion for pivotally connecting said body portion to said flip member, each of said first and second hinge shafts comprising:
    a contact portion having first and second planar surfaces for controlling rotation of said flip member relative to said body portion, said first planar surface having a predetermined angular orientation relative to said second planar surface; and first and second circular portions respectively formed on first and second sides of said contact portion wherein a distance between said first circular portion and said second circular portion defines a length of said contact portion; and first and second resilient members installed within said body portion cooperating with said contact portions of said first and second hinge shafts, respectively, and controlling the rotation of said flip member relative to said body portion, each of said first and second resilient members comprising:

a resilient portion having a planar contact surface positioned between said first and second circular portions of the respective one of said first and second hinge shafts and exhibiting a first linear dimension substantially equal to said length of said contact portion, said planar contact surface engaging only said first planar surface when said flip member is in a first rotational position relative to said body portion and engaging only said second planar surface when said flip member is in a second rotational position relative to said body portion.

15. The hinge apparatus of claim 14, further comprised of said first planar surface having said predetermined angular orientation of about 45 degrees relative to said second planar surface.

16. The hinge apparatus of claim 14, wherein said first rotational position of said flip member relative to said body portion represents a hook-on state of said foldable telephone.

17. The hinge apparatus of claim 16, wherein said second rotational position of said flip member relative to said body portion represents a hook-off state of said foldable telephone.

18. The hinge apparatus of claim 14, wherein said second rotational position of said flip member relative to said body portion represents a hook-off state of said foldable telephone.

19. The hinge apparatus of claim 14, wherein each of said first and second resilient members further comprises an L-shaped connecting portion integral with said resilient portion, said L-shaped connecting portion maintaining said planar contact surface of said resilient portion in a position so that said planar contact surface can flushly engage said first planar surface when said flip member is in said first rotational position relative to said body portion and flushly engage said second planar surface when said flip member is in said second rotational position relative to said body portion.

20. The hinge apparatus of claim 19, further comprised of said first planar surface having said predetermined angular orientation of about 45 degrees relative to said second planar surface.

21. A hinge apparatus for a foldable telephone, comprising:

a body portion;

a flip member pivotally connected to said body portion to rotate with respect to said body portion within a predetermined angular range;

a pair of hinge shafts for connecting said body portion to said flip member and enabling rotation of said flip member relative to said body portion within said predetermined angular range, each one of said hinge shafts comprising first and second planar surfaces with said first planar surface having a substantially non-parallel, predetermined angular orientation with respect to said second planar surface, and first and second circular portions positioned around said first and second planar surfaces; and a pair of resilient members installed within said body portion for engaging and exerting a rotational force upon said pair of hinge shafts, respectively, each one of said resilient members comprising a planar contact surface for engaging said first planar surface of the respective one of said pair of hinge shafts when said flip member is in a closed position relative to said body portion, and engaging said second planar surface of said respective one of said pair of hinge shafts when said flip member is in an open position relative to said body portion, said planar contact surface exhibiting a first length that is substantially equal to a second length that defines a distance between said first and second circular portions, each one of said resilient members further comprising an L-shaped connecting portion for maintaining said planar contact surface in a position so that said planar contact surface can flushly engage only said first planar surface when said flip member is in said closed position and flushly engage only said second planar surface when said flip member is in said open position.

* * * * *